United States Patent [19]

Ono et al.

[11] Patent Number: 4,797,513

[45] Date of Patent: Jan. 10, 1989

[54] GROMMET WITH WIRES SEALED THERETO AND METHOD OF FORMING SAME

[75] Inventors: Mamoru Ono; Kohji Naruse; Toshio Okazaki, all of Aichi, Japan

[73] Assignee: Yazaki Corporation, Japan

[21] Appl. No.: 125,583

[22] Filed: Nov. 25, 1987

[51] Int. Cl.⁴ .................. H01B 17/30; H02G 3/22
[52] U.S. Cl. .................. 174/153 G; 248/56; 264/262; 277/178
[58] Field of Search ............ 174/65 G, 152 G, 153 G, 174/167; 16/2; 248/56; 264/262; 277/4, 178; 439/567, 604

[56] References Cited

U.S. PATENT DOCUMENTS 3,424,857  1/1969  Miller et al. ................ 277/178 X
3,518,359  6/1970  Trimble et al. ............... 174/153 G

*Primary Examiner*—Laramie E. Askin
*Attorney, Agent, or Firm*—Wigman & Cohen

[57] ABSTRACT

To improve noise prevention and waterproof effects and simultaneously wiring workability of a funnel-shaped grommet used for wiring a wire bundle or a cable through a panel, a sealing material is put into the grommet from above to fill a space between a small-diameter cylindrical portion of the grommet and the wire bundle and gaps between wires. The sealing material is a two-liquid polyurethane resin based bonding agent or a nitrile rubber based bonding agent.

5 Claims, 3 Drawing Sheets

GROMMET WITH WIRES SEALED THERETO AND METHOD OF FORMING SAME

BACKGROUND OF THE INVENTION

1. Field of the Invention

The present invention relates to a grommet and more specifically to a structure of a grommet for passing a wire bundle through a panel which partitions two compartments, for instance. The grommet of this kind is attached to a panel disposed between a first compartment (e.g. an engine room of an automotive vehicle) and a second compartment (e.g. a passenger compartment of an automotive vehicle) in order to pass a wire bundle or a cable through the panel without transmitting sound or water.

2. Description of the Prior Art

An example of noise prevention grommets is disclosed in Japanese Published Unexamined (Kokai) Utility Model Application No. 57-15626, as shown in FIGS. 1A and 1B.

This prior-art grommet G is composed of a grommet body a made of a synthetic resin and a noise insulating member b made of a foam plastic material. The grommet body a is formed with a large-diameter cylindrical portion $a_1$ and a small-diameter cylindrical portion $a_2$ and a funnel-shaped portion extending between the two cylindrical portions. Further, an annular groove $a_3$ fittable to a panel P is formed along the outer circumferential surface of the large-diameter cylindrical portion $a_1$.

The noise insulating member b is formed with a central hole $b_1$ through which a cable or a wire bundle C is passed and a radial slit $b_2$ for facilitating the insertion of the cable c thereto.

In the prior-art grommet G as described above, when the wire bundle c is required to be wired by use of the grommet G, the wire bundle c is first passed through the grommet body a; the noise insulating member b is attached to the wire bundle c by opening the slit $b_2$ and then fitted to the large-diameter cylindrical portion $a_1$ of the grommet body a; the wire bundle c and the grommet body a are fixed to each other by taping; lastly the grommet body a is fitted to the panel P with the annular groove $a_3$ fitted to a hole formed in the panel P.

In the prior-art grommet, however, since spaces between the wire bundle c and the grommet body a or the noise insulating member b or between cable wires are not perfectly sealed, there exist various problems as follows: the noise prevention effect is not sufficient; the number of parts of the grommet G is large; the workability of mounting the grommet G to the panel is poor; water seeps from the left side (e.g. an engine room) to the right side (e.g. a passenger compartment) through the cable wires, thus degrading the foam material b and the resin material a; further, the wiring work is not productive because the wire bundle c is first fixed to the grommet body a by taping and then sealed thereto also by taping, in particular when the grommet is used in an assembly line of automotive vehicles.

SUMMARY OF THE INVENTION

With these problems in mind, therefore, it is the primary object of the present invention to provide a grommet which can effectively present noise and water from being passed through the grommet and the wire bundle, while improving the workability of wiring between two compartments.

To achieve the above-mentioned object, a grommet attached to a panel to guide wires through the panel according to the present invention comprises: (a) an elastic funnel-shaped grommet body having a large-diameter cylindrical portion formed with an outer circumferential annular groove fittable to a hole of the panel and a small-diameter cylindrical portion through which the wires are passed; and (b) a penetrating, low viscosity, and waterproof sealing material filling a space between the small-diameter cylindrical portion and the wires and gaps among wires passed through the small-diameter portion of the grommet.

The penetrating, low viscosity, and waterproof sealing material is a two-liquid polyurethane resin based bonding agent or a nitrile rubber based bonding agent. Further, the grommet is further formed with an annular sealing material reservoir groove on an inner circumferential surface of the small-diameter cylindrical portion of the grommet.

Further, a method of sealing wires to a grommet fittable to a panel to guide the wires passing through the panel, of the present invention, comprises: (a) passing the wire bundle through a large-diameter cylindrical portion and a small-diameter cylinder portion of the grommet; (b) positioning the grommet at a predetermined position on the wires; (c) temporarily fixing the wires to the grommet by taping a border between the small diameter cylindrical portion and the wires; (d) standing up the grommet so that the larger diameter cylindrical portion faces upward, (e) putting a sealing material from above the grommet to fill a space between the small-diameter cylindrical portion and the wires and gaps among the wires; and (f) hardening the sealing material before fitting the grommet to a hole of the panel.

BRIEF DESCRIPTION OF THE DRAWINGS

The features and advantages of the grommet of the present invention will be more clearly appreciated from the following description taken in conjunction with the accompanying drawings in which.

DETAILED DESCRIPTION OF THE PREFERRED EMBODIMENTS

Figure 1A:
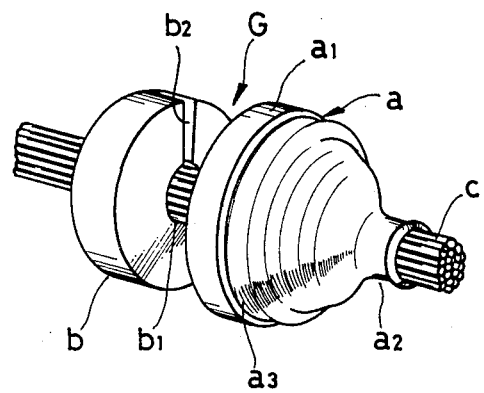
FIG. 1A is a perspective view showing a prior-art grommet.
Figure 1B:
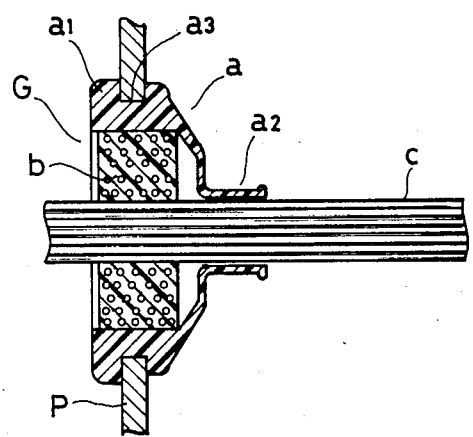
FIG. 1B is a cross-sectional view of the grommet shown in FIG. 1A.
Figure 2A:
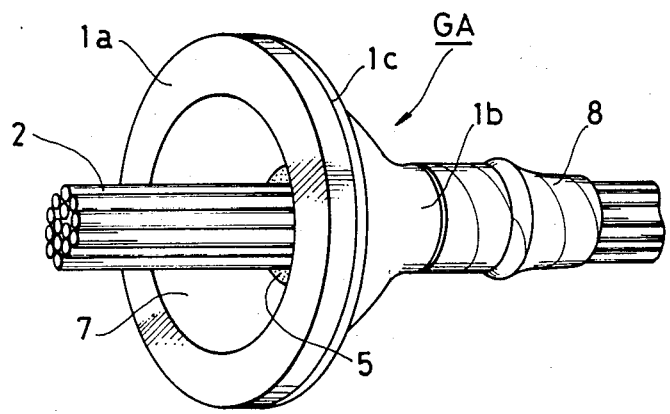
FIG. 2A is a perspective view showing a grommet of the present invention.
Figure 2B:
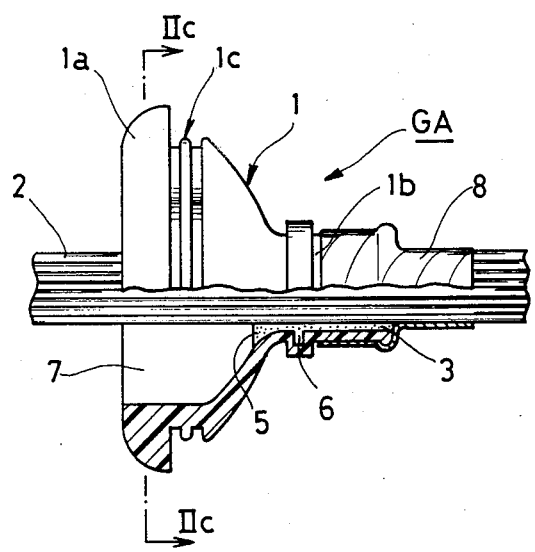
FIG. 2B is a side view, partially cross-sectional view, of the grommet shown in FIG. 2A.
Figure 2C:
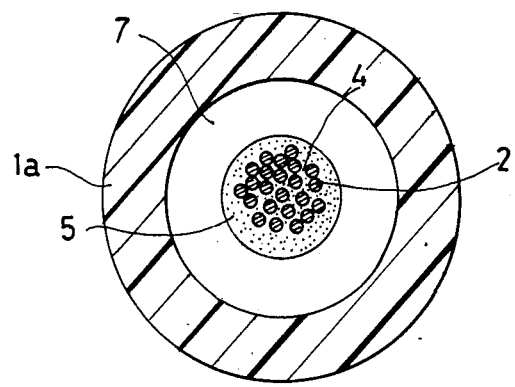
FIG. 2C is a cross-sectional view taken along the line IIC—IIC shown in FIG. 2B.

A grommet of the present invention will be described with reference to the attached drawings. In FIGS. 2A, 2B and 2C, a grommet GA of the present invention comprises a grommet body 1 and a sealing material 5. The grommet body 1 is made up of a large-diameter cylindrical portion 1a, a small-diameter cylindrical portion 1b and a funnel-shaped portion extending between the two cylindrical portions 1a and 1b. Further, an annular fitting groove 1c is formed along the outer circumferential surface of the large-diameter cylindrical portion 1a, and the grommet body 1 is made of an elastic material. The sealing material 5 of penetrating and waterproof characteristics is used to fill a space 3 formed between a wire bundle or a cable 2 and the small-diameter cylindrical portion 1b and gaps 4 formed among wires of the bundle 2 passed through the small-diameter cylindrical portion 1b (shown in FIG. 2C).

Sealing material 5 is a liquid resin or rubber excellent in penetrability, waterproof characteristics, and bondability to rubber and resin and hardenable with the lapse of time due to chemical reaction, for instance, such as two-liquid polyurethane resin based bonding agent or nitrile rubber based bonding agent.

Further, in the grommet of the present invention, a sealing material reservoir groove 6 is formed in the small-diameter cylindrical portion 1b to allow the sealing material to enter into the space 3 more easily and the gap 4 among wires 2. Furthermore, a sufficiently large space 7 is provided between the wire bundle or the cable 2 and the large-diameter cylindrical portion 1a in order to allow the large-diameter cylindrical portion 1a to be easily deformably fitted to a hole formed in a panel (not shown).

The effect of the grommet of the present invention will be described hereinbelow.

In wiring operation, the wire bundle 2 is passed through the large-diameter cylindrical portion 1a and the small-diameter cylindrical portion 1b of the grommet GA; the grommet GA is positioned at an appropriate position on the wire bundle 2 and temporarily fixed to the wire bundle 2 by taping a vinyl tape 8, for instance around a border between the small-diameter cylindrical portion 1b and the wire bundle as shown in FIGS. 2A and 2B; stand the grommet GA together with the wire bundle 2 so that the large-diameter cylindrical portion 1a faces upward; a sealing material is put into the grommet GA from the large-diameter cylindrical portion 1a so that the space 3 between the small-diameter cylindrical portion 1b and the wire bundle 2 and the gap 4 among the wires are sufficiently filled with the sealing material. In this step, the reservoir groove 6 formed in the inner surface of the small-diameter cylindrical portion 1b serves to promote the permeation and filling of the sealing material into the space 3 and the gap 4; with the lapse of time, the sealing material 5 is hardened so that the grommet GA and the wire bundle 2 are bonded and sealed perfectly.

The completely sealed grommet GA is fitted to a panel of an automotive vehicle, for instance with the fitting groove 1c engaged with a hole formed in the panel.

The hardened sealing material 5 can markedly reduce the transmission of noise through the space 3 and the gap 4. Further, since an equivalent mass of the grommet increases due to the presence of the sealing material, vibrations can be reduced and thereby the production of noise can also be reduced.

Further, since the sealing material 5 is of waterproof type, it is possible to perfectly prevent water from seeping through the space 3 and the gaps 4. Further, since the wire bundle 2 is strongly fixed to the grommet GA via the sealing material 5, it is unnecessary to firmly fix the grommet GA to the wire bundle 2 by taping, thus improving the wiring workability in mounting the grommet on an automotive vehicle, for instance.

Further, even if the outer diameter of the wire bundle 2 is smaller than the inner diameter of the small-diameter cylindrical portion 1b, since the end of the space 3 can be sealed by the tape 8 in temporarily fixing the grommet to the wire bundle 2, it is possible to prevent the sealing material 5 from flowing outside through the space 3.

As described above, in the grommet of the present invention, it is possible to sufficiently enhance the noise prevention and waterproof effects and to improve the wiring efficiency of the wire bundle by simply putting a sealing material into a space between the grommet and the wire bundle and a gap between wires. In addition, the grommet of the present invention is usable even when the outer diameter of the wire bundle is a little different from the inner diameter of the small-diameter cylindrical portion of the grommet.

Further, in the above description, only the case where a wire bundle is passed through and fixed to the grommet has been described. However, without being limited thereto, it is of course possible to fix a cable or a wire harness to the grommet. In the case of the wire harness, it is preferable to form a rectangular hole at the small-diameter cylindrical portion of the grommet.

What is claimed is:

1. An assembly of a grommet and wires extending therethrough, comprising:
   (a) an elastic funnel-shaped grommet body having a large-diameter cylindrical portion formed with an outer circumferential annular groove fittable to a hole of a panel and a small-diameter cylindrical portion through which the wires are passed; and
   (b) a penetrating and waterproof sealing material filling a space between the small-diameter cylindrical portion and the wires and gaps among wires passed through the small-diameter portion of the grommet.

2. The assembly as set forth in claim 1, wherein said penetrating and waterproof sealing material is a two-liquid polyurethane resin based bonding agent.

3. The assembly as set forth in claim 1, wherein said penetrating and waterproof sealing material is a nitrile rubber based bonding agent.

4. The assembly as set forth in claim 1, wherein said grommet body is further formed with an annular sealing material reservoir groove on an inner circumferential surface of the small-diameter cylindrical portion of the elastic funnel-shaped grommet body.

5. A method of sealing wires to a grommet fittable to a panel to guide the wires passing through the panel, which comprises the following steps of:
   (a) passing wires through a large-diameter cylindrical portion and a small-diameter cylindrical portion of a grommet;
   (b) positioning the grommet at a determined position on the wires;
   (c) temporarily fixing the wires to the grommet by taping a border between the small diameter cylindrical portion and the wires;
   (d) standing up the grommet so that the larger diameter cylindrical portion faces upward;
   (e) putting a sealing material from above the grommet to fill a space between the small-diameter cylindrical portion and the wires and gaps among the wires; and
   (f) hardening the sealing material before fitting the grommet to a hole of the panel.

* * * * *